US007901524B1

(12) United States Patent
McKnight et al.

(10) Patent No.: US 7,901,524 B1
(45) Date of Patent: *Mar. 8, 2011

(54) ACTUATION CONCEPTS FOR VARIABLE STIFFNESS MATERIALS

(75) Inventors: Geoffrey McKnight, Los Angeles, CA (US); Bill Barvosa-Carter, Ventura, CA (US); Chris Henry, Newbury Park, CA (US); Andrew Keefe, Encino, CA (US); Richard Ross, Los Angeles, CA (US); Guillermo Herrera, Winnetka, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1083 days.

This patent is subject to a terminal disclaimer.

(21) Appl. No.: 11/347,505

(22) Filed: Feb. 3, 2006

Related U.S. Application Data

(60) Provisional application No. 60/650,046, filed on Feb. 4, 2005.

(51) Int. Cl.
*C22F 1/00* (2006.01)
*B64C 5/10* (2006.01)
*B29C 61/00* (2006.01)
*B21D 39/08* (2006.01)

(52) U.S. Cl. ............. 148/563; 72/57; 72/700; 244/99.8; 264/230

(58) Field of Classification Search .................. 148/563; 264/230; 244/99.8; 72/57, 700
See application file for complete search history.

(56) References Cited

U.S. PATENT DOCUMENTS

| 2,954,622 | A |  | 10/1960 | Moore |  |
|---|---|---|---|---|---|
| 4,522,393 | A |  | 6/1985 | Dunn |  |
| 5,079,920 | A | * | 1/1992 | Whitehead et al. | 60/527 |
| 5,700,337 | A | * | 12/1997 | Jacobs et al. | 156/64 |
| 5,825,275 | A | * | 10/1998 | Wuttig et al. | 337/139 |
| 5,887,828 | A | * | 3/1999 | Appa | 244/215 |
| 6,000,660 | A |  | 12/1999 | Griffin et al. |  |
| 6,175,170 | B1 |  | 1/2001 | Kota et al. |  |
| 6,182,929 | B1 |  | 2/2001 | Martin et al. |  |
| 6,265,333 | B1 |  | 7/2001 | Dzenis et al. |  |
| 6,301,742 | B1 |  | 10/2001 | Kota |  |
| 6,447,478 | B1 | * | 9/2002 | Maynard | 604/95.05 |
| 6,583,533 | B2 | * | 6/2003 | Pelrine et al. | 310/309 |

(Continued)

FOREIGN PATENT DOCUMENTS

WO    WO 03/101722    * 12/2003

(Continued)

OTHER PUBLICATIONS

Office Action dated Jan. 9, 2008 for U.S. Appl. No. 11/193,148.

(Continued)

*Primary Examiner* — David R Sample
*Assistant Examiner* — Nicole T Gugliotta
(74) *Attorney, Agent, or Firm* — Christie, Parker, Hale

(57) ABSTRACT

Apparatus and associated methods for actuating variable stiffness material (VSM) structures and achieving deformation of the structures. The apparatus and the associated methods use internal embedded actuation elements and/or externally attached elements to the VSM structures to achieve the desired deformation. In particular, the actuation can be changed due to the variable stiffness nature of the materials. That is, the invention provides the ability to control the deformation of structures using local stiffness control over subregions of the component in addition to or in substitution for actuation. Furthermore, the invention exploits the variable stiffness properties of the VSM structures to enable new functionalities impossible to realize with conventional constant stiffness materials.

24 Claims, 11 Drawing Sheets

U.S. PATENT DOCUMENTS

| | | | |
|---|---|---|---|
| 7,250,839 | B2 | 7/2007 | Racz et al. |
| 7,550,189 | B1 * | 6/2009 | McKnight et al. ............ 428/116 |
| 2003/0102411 | A1 | 6/2003 | Kota |
| 2003/0234598 | A1 * | 12/2003 | Fuller et al. ................... 310/328 |
| 2003/0235460 | A1 | 12/2003 | Moon et al. |
| 2004/0197519 | A1 | 10/2004 | Elzey et al. |

FOREIGN PATENT DOCUMENTS

| | | | |
|---|---|---|---|
| WO | WO 03/018853 | * | 3/2009 |

OTHER PUBLICATIONS

Liang, C. et al., Investigation of Shape Memory Polymers and Their Hybrid Composites, *Journal of Intelligent Material Systems and Structures*, vol. 8, Apr. 1997, pp. 380-386.

Yalcintas, M., et al., Electrorheological material based non-homogeneous adaptive beams, *Smart Mater. Struct.*, vol. 7 (1998), pp. 128-143.

Yalcintas, M., et al., Magnetorheological and electrorheological materials in adaptive structures and their performance comparison, *Smart Mater. Struct.*, vol. 8 (1999), pp. 560-573.

Lake, M.S., et al., Application of Elastic Memory Composite Materials to Deployable Space Structures, Presented at the AIAA Space 2001 Conference and Exposition, Aug. 28-30, 2001, Albuquerque NM, AIAA Paper No. 2001-4602, pp. 1-10.

Abrahamson, E.R., et al., Shape Memory Polymers for Elastic Memory Composites, Presented at the 43rd Structures, Structural Dynamics, and Materials Conference, Apr. 22-25, 2002, Denver CO, AIAA Paper No. 2002-1562, pp. 1-11.

Cadogan, D.P., et al., Shape Memory Composite Development for Use in Gossamer Space Inflatable Structures, Presented at the 43rd AIAA/ASME/ASCE/AHS/ASC Structures, Structural Dynamics, and Materials Conference & Exhibit, Apr. 22-25, 2002, Denver, CO, AIAA Paper No. 2002-1372, pp. 1-11.

Lake, M.S., et al., The Fundamentals of Designing Deployable Structures with Elastic Memory Composites, Presented at the 43rd Structures, Structural Dynamics, and Materials Conference, Apr. 22-25, 2002, Denver, CO, AIAA Paper No. 2002-1454, pp. 1-13.

Francis, W., et al., Development and Testing of a Hinge/Actuator Incorporating Elastic Memory Composites, Presented at the 44th Structures, Structural Dynamics, and Materials Conference, Apr. 7-10, 2003, Norfolk, VA, AIAA Paper No. 2003-1496, pp. 1-14.

File History of U.S. Patent No. 7,550,189, issued on Jun. 23, 2009 citing the references listed herein.

Douglas Campbell, Arup Maji, Deployment Precision and Mechanics of Elastic Memory Composites, 44th Structures, Structural Dynamics, and Materials Conference, Apr. 7-10, 2003, Norfolk, Nirginia AIAA 2003-1495. On Order.

Douglas Campbell, Arup Maji, Deployment Precision and Mechanics of Elastic Memory Composites, 44th Structures, Structural Dynamics, and Materials Conference, Apr. 7-10, 2003, Norfolk, Virginia AIAA 2003-1495.

Melek Yalcintas and Heming Dai, Magnetorheological and electrorheological materials in adaptive structures and their performance comparison, 1999, pp. 560-573, Smart Mater. Struct. 8, UK.

Mark Lake, Naseem Munshi, Michael Tupper, and Troy Meink, Application of Elastic Memory Composite Materials to Deployable Space Structures, AIAA Space 2001 Conference and Exposition, Aug. 28-30, 2001, pp. 1-10, AIAA 2001-4602, American Institute of Aeronautics and Astronautics, Albuquerque, New Mexico.

Erik Abrahamson, Mark Lake, Naseem Munshi, and Ken Gall, Shape Memory Polymers for Elastic Memory Composites, 43rd Structures, Structural Dynamics, and Materials Conference, Apr. 22-25, 2002, pp. 1-11, AIAA 2002-1562, American Institute of Aeronautics and Astronautics, Denver, Colorado.

David Cadogan, Stephen Scarborough, John Lin, and George Sapna III, Shape Memory Composite Development for Use in Gossamer Space Inflatable Structures, 43rd AIAA/ASME/ASCE/AHS/ASC Structures, Structural Dynamics, and Materials Conference & Exhibit, Apr. 22-25, 2002, pp. 1-11, AIAA 2002-1372, American Institute of Aeronautics and Astronautics, Denver, Colorado.

Mark Lake and Fred Beavers, the Fundamentals of Designing Deployable Structures with Elastic Memory Composites, 43rd Structures, Structural Dynamics, and Materials Conference, Apr. 22-25, 2002, pp. 1-13, AIAA 2002-1454, American Institute of Aeronautics and Astronautics, Denver, Colorado.

Will Francis, Mark Lake, Kaushik Mallick, Gregg Freebury, and Arup Maji, Development and Testing of a Hinge/Actuator Incorporating Elastic Memory Composites, 44th Structures, Structural Dynamics, and Materials Conference, Apr. 7-10, 2003, pp. 1-14, AIAA 2003-1496, American Institute of Aeronautics and Astronautics, Norfolk, Virginia.

U.S. Non-Final OFFICE ACTION dated Mar. 31, 2010 for U.S. Appl. No. 12/467,693, 69 pages.

* cited by examiner

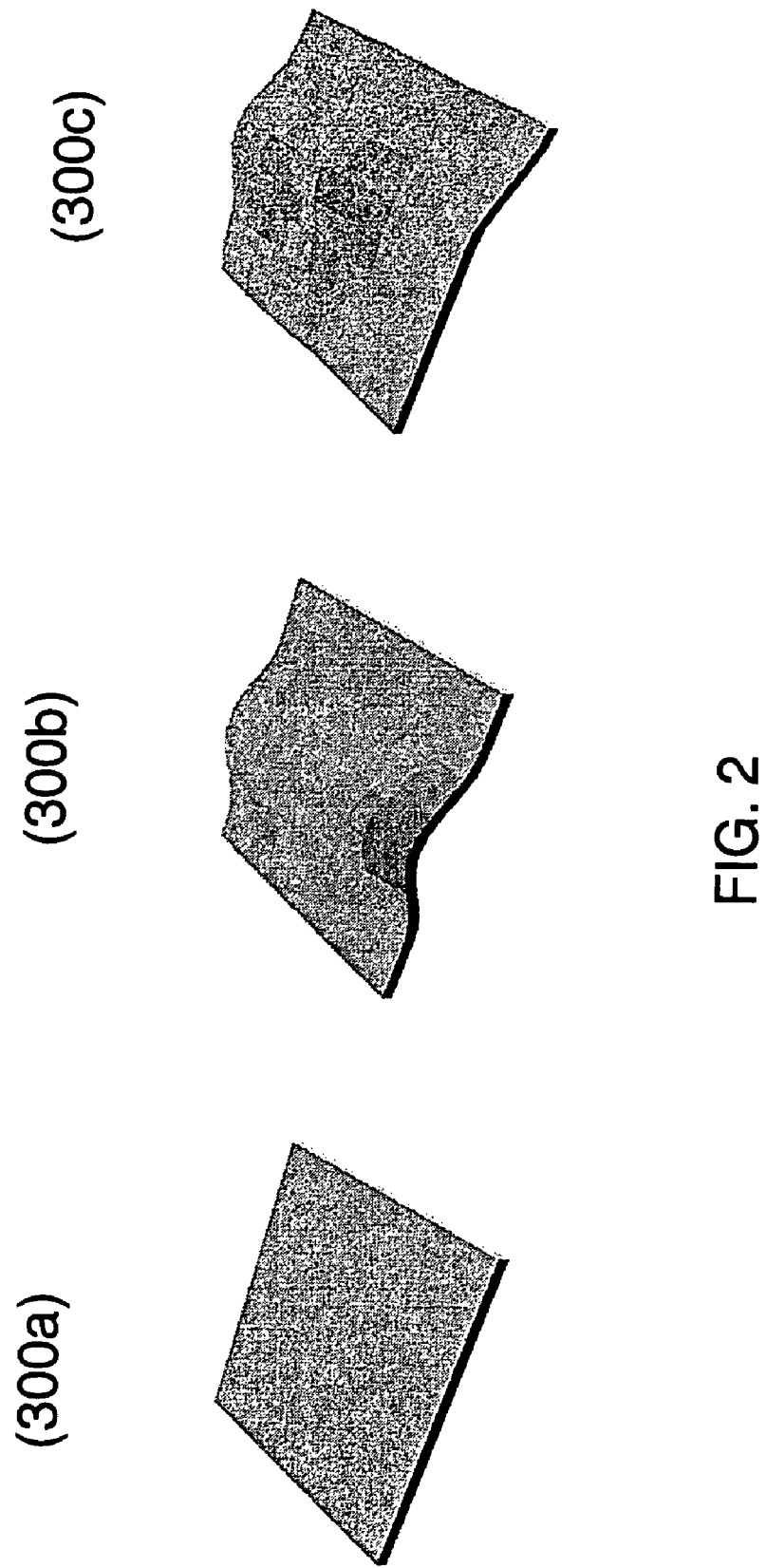

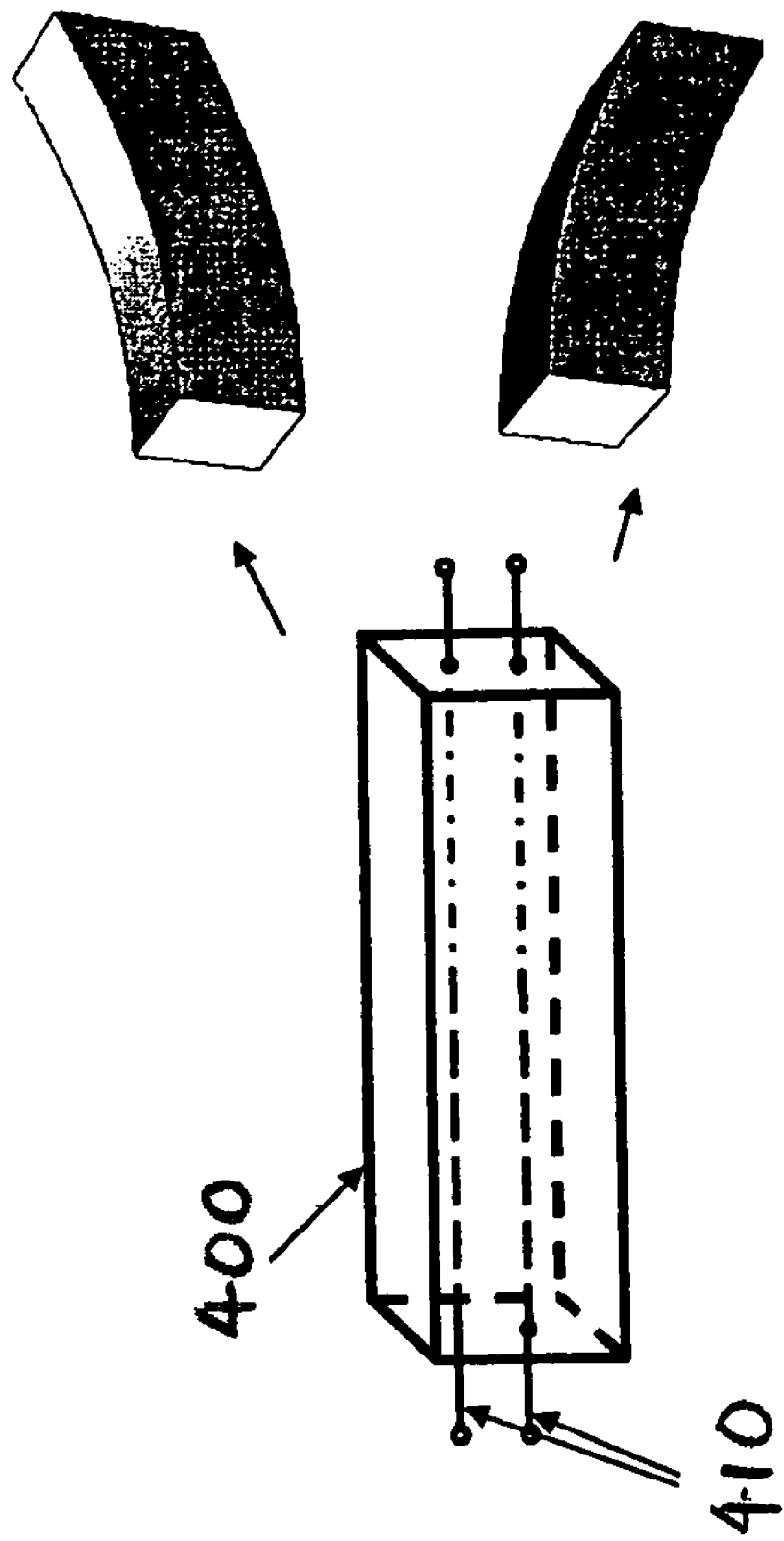

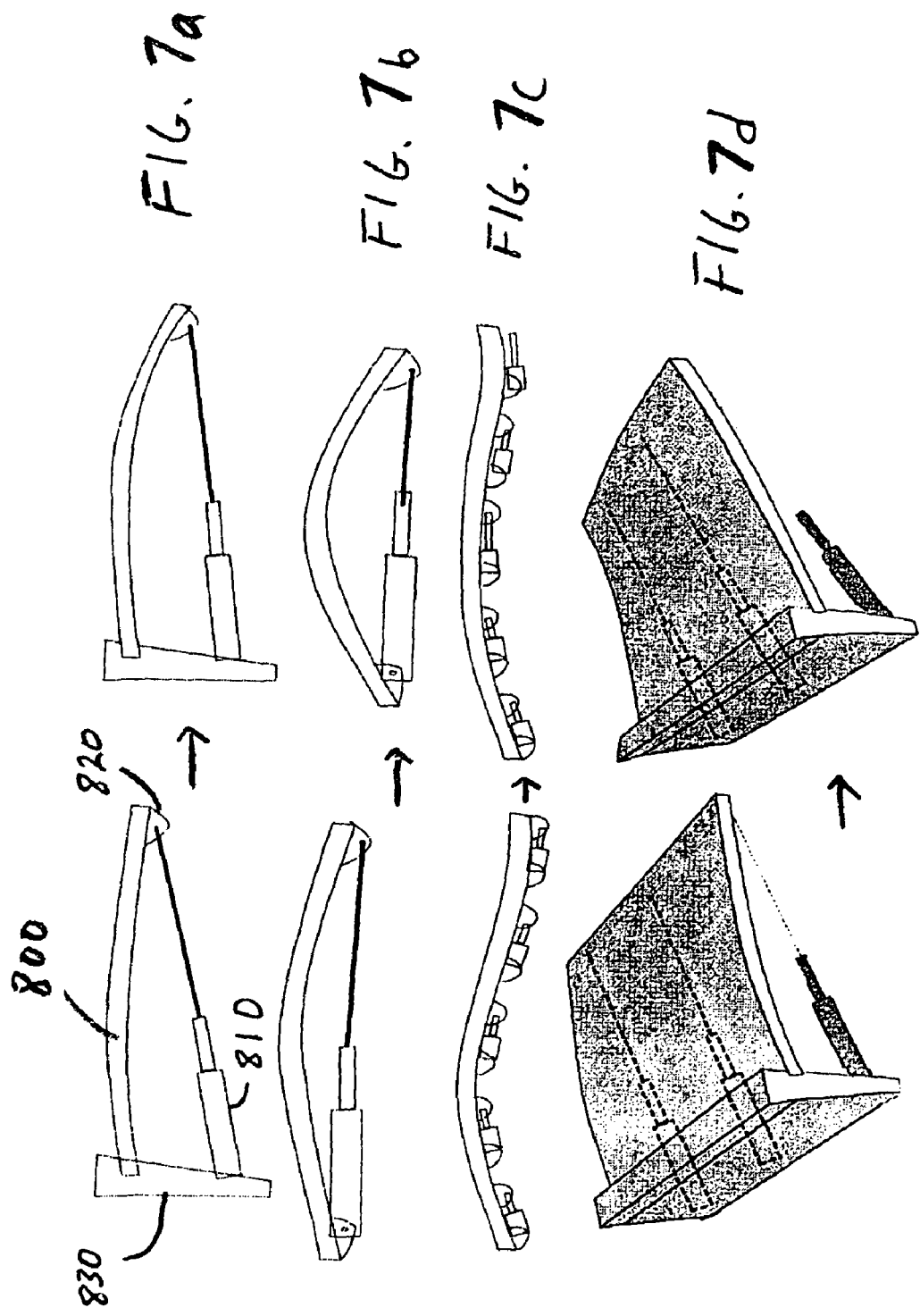

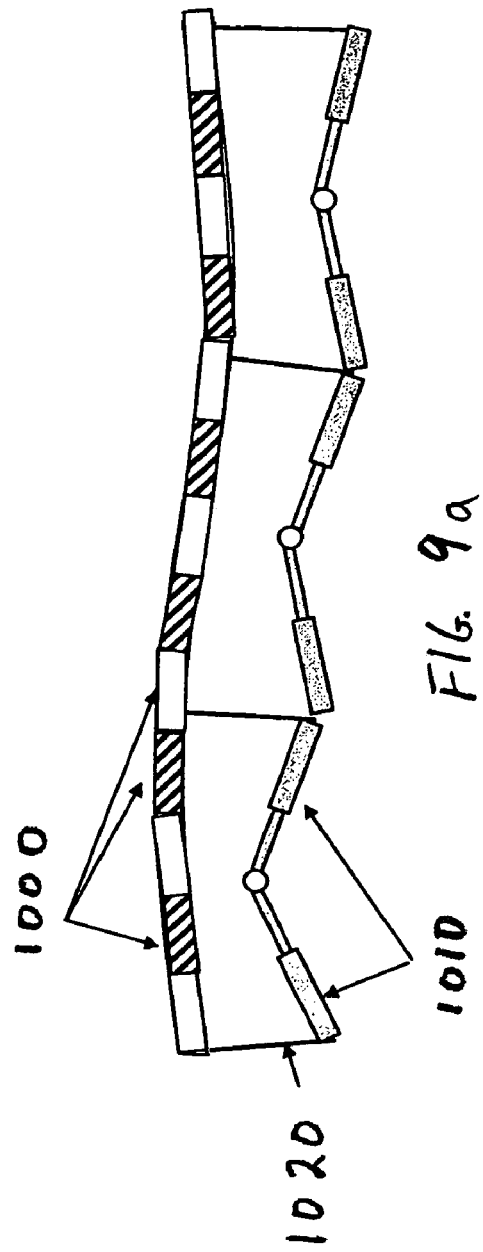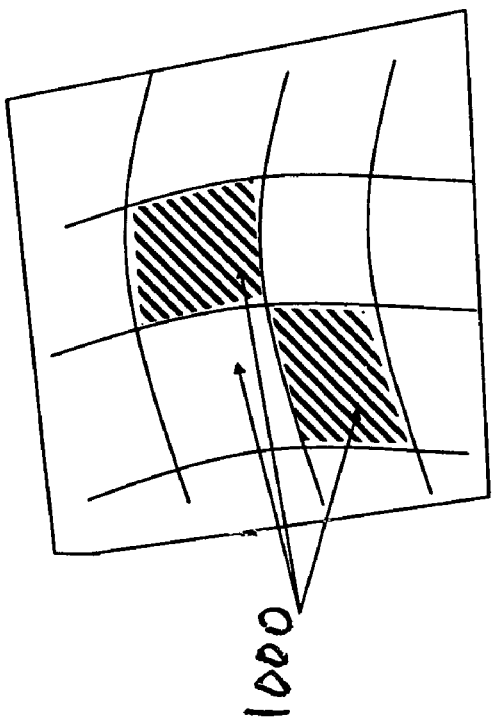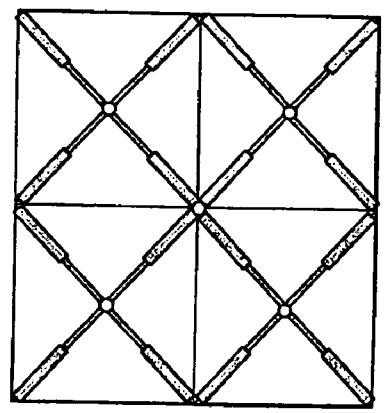

ACTUATION CONCEPTS FOR VARIABLE STIFFNESS MATERIALS

CROSS-REFERENCE TO RELATED APPLICATION(S)

This application claims priority to and the benefit of U.S. Provisional Application No. 60/650,046, filed on Feb. 4, 2005, the entire content of which is incorporated herein by reference.

FIELD OF THE INVENTION

The invention relates generally to variable stiffness materials and, more particularly, to a system and method for actuating these materials to achieve a structural deformation.

BACKGROUND OF THE INVENTION

Variable stiffness materials and structures would be very useful and have many applications in next-generation automobiles, aerospace components, and/or defense systems. The ability to alter the stiffness (or modulus of elasticity) of a structure or element of a structure and then re-stiffen would have many applications, such as a reconfigurable aerofoil. As such, there is a need for variable stiffness material (VSM) structures, and, more particularly, laminates of constant stiffness material layers and variable stiffness material layers to provide exemplary variable stiffness material (VSM) structures that can be stiffened and softened with ease. Special design allows a softened state (or mode) to achieve large reversible deformation with relative small input energy while maintaining high stiffness in a structural mode.

In addition, it is desirable to provide a system and method for actuating the above described VSM structures to achieve a structural deformation to, for example, morph their shape(s) to provide additional functionality and performance optimization over a broader range of conditions than currently possible with fixed shape components. As such, there is a need to augment VSM structures, in reconfigurable surface applications for example, by providing systems and methods for actuating these structures over one or more sub-regions to achieve a structural deformation.

SUMMARY OF THE INVENTION

The invention relates to apparatus and associated methods for actuating variable stiffness material (VSM) structures and achieving deformation of the structure. Embodiments of the inventions use internal embedded actuation elements and/or externally attached elements to VSM structures to achieve the desired deformation. In one particular embodiment, the deformation is changed due to the variable stiffness nature of the materials. That is, an embodiment of the invention provides the ability to control the deformation of structures using stiffness local control over subregions of the component in addition to or in substitution for actuation. As such, embodiments of the present invention, when used in combination with the VSM structures enable the construction of components which can be deformed during service to increase functionality, such as a case where the shape of the component is intrinsically tied to performance, a case where the variations of the shape allow overall system performance enhancements, and/or a case where the use of the variability allows for reconfigurable tooling and deployable structures.

Embodiments of the invention apply actuation to layered variable stiffness composite materials and other suitable variable stiffness materials to actuate VSM structures that may be reversibly deformed and set into place. Furthermore, embodiments of the invention exploit the variable stiffness properties of the VSM structures to enable new functionalities impossible to realize with conventional constant stiffness materials.

In one embodiment of the invention, a deformable apparatus having a transformable state of stiffness includes a VSM structure and one or more actuation elements. The VSM structure includes a plurality of constant stiffness material layers, and a plurality of variable modulus material layers arranged in alternating layers with the plurality of constant stiffness material layers. The plurality of variable modulus material layers includes a material having a changeable elastic modulus in response to a trigger so as to allow reversible coupling and decoupling of stress transfer between successive layers of the plurality of constant stiffness material layers to provide a change in the transformable state of stiffness of the VSM structure.

The one or more actuation elements are controlled to deform the VSM structure by providing actuation upon transformation of the structure from a first state of stiffness to a second state of stiffness. The second stiffness state is a reduced stiffness state which allows greater deformation and with reduced energy input as compared to the initial state. After transformation, the stiffness may be returned to the initial stiffness state to allow the structure to accommodate larger loads and possess increased strength.

In the deformable apparatus of the present embodiment, respective states of stiffness corresponding to the individual portions of the VSM structure are individually controllable to deform the VSM structure. In particular, at least one of the individual portions is controlled to transform from a first state of stiffness to a second state of stiffness. The second state has a lower degree of stiffness than the first state. At least another one of the individual portions is controlled to remain in the first state of stiffness while at least one of the individual portions is controlled from the first state of stiffness to the second state of stiffness. In addition, at least one of the individual portions is further controlled to transform from the second state of stiffness such that the overall stiffness distribution within the structure is altered. Therefore, a multitude of stiffness configurations can be assembled by controlling the stiffness states of the individual portions. This behavior allows the effect of actuators on the structure to be altered to achieve improved shape control.

A more complete understanding of the actuation concepts for variable stiffness materials will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

These and other features, aspects, and advantages of the present invention will be more fully understood when considered with respect to the following detailed description and the following accompanying drawings:

FIG. 2 illustrates a deformation of a variable stiffness surface using actuation components according to an exemplary embodiment of the present invention.

FIG. 3 illustrates an embedded axial actuation of a VSM structure to enable a bending deformation;

FIGS. 7a, 7b, 7c, and 7d illustrate an external actuation using VSM structures and components according to another exemplary embodiment of the present invention;

FIGS. 9a, 9b, and 9c respectively are cross-sectional, bottom, and top views illustrating distributed external actuation and local stiffness control of a two-dimensional VSM structure;

DETAILED DESCRIPTION

The invention is described below, with reference to detailed illustrative embodiments. It will be apparent to a person skilled in the art that the invention can be embodied in a wide variety of forms, some of which may be quite different from those of the disclosed embodiments. Consequently, the specific structural and functional details disclosed herein are merely representative and do not limit the scope of the invention.

Embodiments of the present invention are directed to systems and methods that provide variable stiffness material (VSM) structures with 1) external actuation; 2) internal actuation; 3) internal integrated actuation; and/or 4) variable stiffness actuation, so as to provide morphable or reconfigurable structures. The stiffness of the VSM structures may be changed according to an external control signal from a high structural type load to a low stiffness, where the VSM structures may be deformed with relatively little energy. Once deformed, the structure may be returned to a high stiffness state. In particular, embodiments of the present invention incorporate actuation components with a VSM structure in order to create a structure capable of changes in shape.

Figure 1:
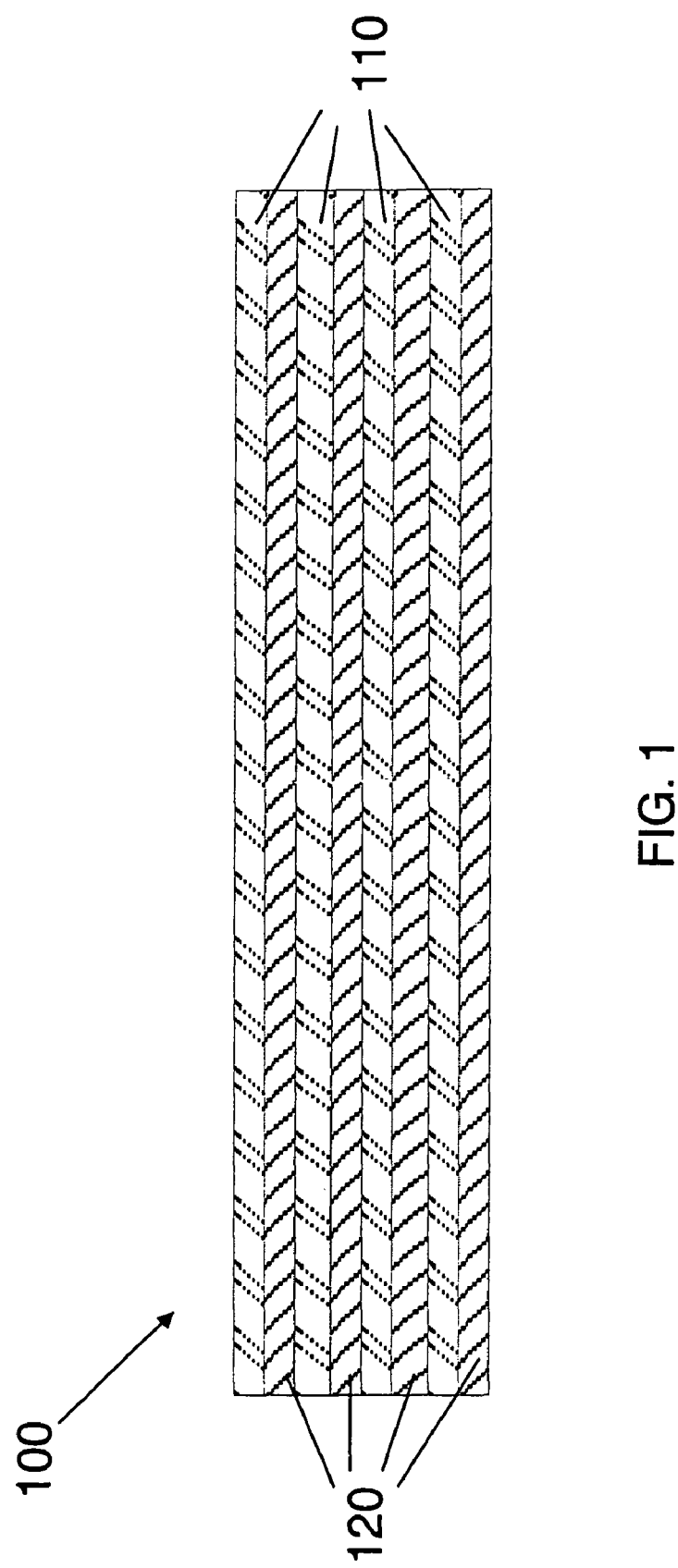
FIG. 1 illustrates a cross-sectional view of a variable stiffness material (VSM) structure according to an embodiment of the present invention.

FIG. 1 is a cut away perspective view of a simplified illustration of a VSM structure 100 in accordance with an embodiment of the present invention. The VSM structure 100 includes constant stiffness material layers 110 and variable modulus (or stiffness) material layers 120. The VSM structure 100 is a structure whose elastic stiffness in bending and/or axial/compression loading may be adjusted when required by applying, exposing, or otherwise subjecting the structure to, appropriate control conditions (i.e. thermal, electrical, magnetic, chemical, electromagnetic, etc.). In the embodiment shown in FIG. 1, the constant stiffness material layers 110 and the variable modulus material layers 120 are arranged in alternating layers.

In assembling one embodiment of a VSM structure as described in U.S. patent application Ser. No. 11/193,148, the entire content of which is incorporated herein by reference, a VSM structure (e.g., the VSM structure 100 of FIG. 1) composed of two or more materials may be arranged such that the materials form the layers of a laminated stack, with the two or more materials alternating in sequence. One material is of constant stiffness and is selected to provide the load bearing capabilities and also significant elastically reversible strain. The other material is selected to provide a large change in modulus (or stiffness) in response to a control signal and sustain significant shear deformation. Using a rule of mixtures as a simple model, the modulus in both the stiffest state and most compliant state of a VSM structure can be approximated. From this approximation, it is observed that a large change in effective material modulus may be obtained by increasing the number of layers.

In addition, the variable modulus layer according to certain embodiments of the present invention may take many forms, including materials that change properties based on electrical, magnetic, and/or thermal fields. The function of this layer is to alternatively connect and disconnect the elastic layers mechanically so that either stress is transferred from one layer to the next or not. The effect of this connection/disconnection is to alter the stiffness of the material significantly. Again as derived above for the upper/lower bound stiffness equations, this results from cubic dependence of bending stiffness on thickness. Suitable materials should exhibit a large reversible change in intrinsic modulus or shear modulus and this effect should take place over as great a strain range as possible. For example, magnetostrictive and piezoelectric materials exhibit a large change in modulus (5×), but with a strain range of ~500 microstrain (0.05%). In contrast, a shape memory polymer material may exhibit a change in modulus of 100× and may exhibit this effect over a strain range of ~100%. However, other considerations may also be important depending on the application of the VSM structure. If response time is important, a field activated material such as magnetostrictive or piezoelectric material could supply a rapid change in modulus on the order of fractions of milliseconds. In contrast, a shape memory polymer material requiring thermal stimulation will have response times on the order of seconds to minutes and may require significantly larger amounts of energy to obtain the change in stiffness. Another attribute of the active material could be to supply a zero power hold capability to the structure or surface utilizing a VSM structure. This would require the variable stiffness component to have sufficient stiffness in the zero power state to resist any strain energy built up in the elastic components. A shape memory polymer can be used in performing this action. This attribute is important because in the case of a deformable surface or structure, much of the benefit could be lost if continuous power is required to maintain a given state.

An exemplary embodiment of the present invention utilizes a shape memory polymer material with as large as possible a change in stiffness and also with the greatest possible strain deformation. This combination will permit a VSM structure to be constructed with a large reversible strain and zero power hold, which has important implications to morphing surfaces and structures. Again the most pressing limitation of this approach is the thermal nature of activation which requires both a large amount of energy to induce a change as well as long durations due to the relatively slow thermal transport.

Embodiments of the present invention can be applied to many types of structural components where it is desired to alter the shape of the component. This could include reconfigurable surfaces, structural members such as beams and trusses, and others. Reconfiguration can enable many types of new functionality not currently available in structures and systems. These include performance optimization over broad operation conditions (e.g., a jet inlet nozzle that can have a quiet shape for take-off and a performance shape for cruising), enabling multiple functions from a single system, optimized interaction with wave phenomenon, changes in surface appearance or texture, and others. In particular, the structures and materials provided by embodiments of the present invention enable a new magnitude of deformation and stiffness in a structural component that is not achievable with non-variable stiffness materials. Components suitable for morphing of shape include surfaces, struts, springs, box frames, stringers, beams, torsion members, etc.

Embodiments of the present invention incorporate actuation elements (or components or devices) into and/or with VSM structures to enable large deformation of system components. The incorporation of actuation elements into and/or with the VSM structures allows deformation to be achieved, which may be used to change the shape of the system or structural components. That is, the embodiments use both actuation force and stiffness changes to achieve changes in structural geometry while deformation of traditional constant (or single) stiffness value components was limited to manipulation of the elastic energy of the component via applied forces and moments. The control of stiffness in embodiments of the present invention provides additional functionality to deformable structures.

A first exemplary embodiment and a second exemplary embodiment to achieve actuation of VSM structures are provided below. The first exemplary embodiment embeds actuators within the a VSM structure itself, which can be made to change shape and exert a force on the VSM structure via an external control signal such as an applied electric, thermal, and/or magnetic field. The second exemplary embodiment uses actuators external to the material/component which apply force to a VSM structure via contact points with the VSM structure. Both of these exemplary actuating embodiments may be used either as single point actuators or as a system of distributed actuators throughout a VSM structure.

In the first exemplary embodiment of the present invention, internal actuation elements may be embedded within composite VSM structures as described above, for example, a laminated VSM structure (as compared with monolithic variable stiffness materials). Generally, the first exemplary embodiment uses actively deformable elements placed strategically into a VSM structure to provide the desired deformation characteristics. The actively deformable elements may include a wide variety of materials whose intrinsic shape may be changed by applying a certain control field (e.g. piezoelectric, shape memory, magnetostrictive) and which may perform work in deforming the structure.

Referring now to FIG. 2, the first exemplary embodiment provides a deformation of a variable stiffness surface of a VSM structure using actuation elements. The VSM structure can be composed of alternating layers of static and dynamic modulus materials. However, for purposes of simplification, the laminated VSM structure of the first exemplary embodiment is shown as a monolithic block in FIG. 2, and the present invention is not thereby limited. Actively deformable elements are placed into the structure and bonded such that their deformation may cause an overall deformation of the structure.

The general method for using the actively deformable elements as shown in FIG. 2 is to first allow the VSM structure, starting in its high stiffness state, to be transformed to low stiffness (300a). Next, the actively deformable elements are activated so that the shape of the VSM structure is changed (elongation, contraction, shear, or bending). Mechanical coupling between the VSM structure and the actively deformable elements causes the whole structure to be deformed (300b). The VSM structure is then returned to a high stiffness state while the actively deformable elements maintain deformation. The actively deformable elements are then de-activated (300c). As such, if the VSM structure is a zero-power hold type, the VSM structure will hold its new position.

Figures 4A, 4B, 4C:
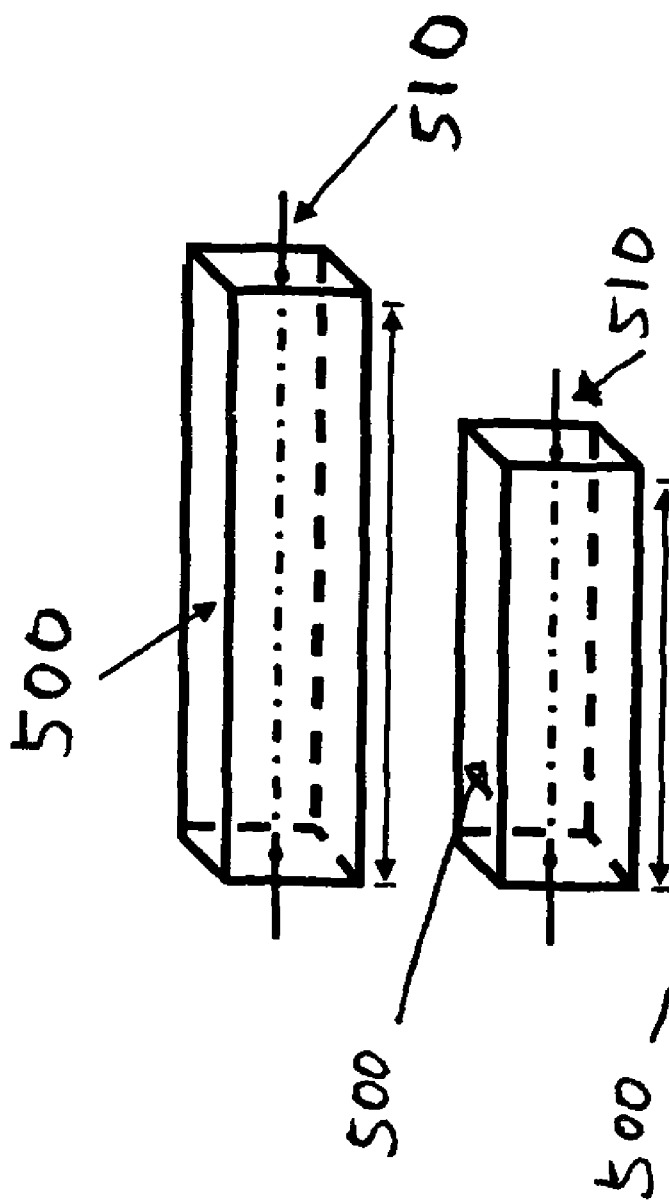
FIGS. 4a, 4b, and 4c illustrate an embedded actuation of a VSM structure to enable an axial (or extensional) deformation.

For the first exemplary embodiment, many different deformation possibilities exist. FIG. 3 shows an embedded actuation of a VSM structure (shown as a monolithic block for simplification purposes) 400 using embedded actively deformable materials (or elements) 410 to allow for a bending deformation. In FIG. 3, both bending and extension type deformation are possible. FIGS. 4a, 4b, and 4c show an embedded actuation of a VSM structure (again shown as a monolithic block for purposes of simplification) 500 using an embedded actively deformable element 510 to enable an axial (extensional) deformation. That is, FIG. 4a shows the VSM structure 500 in its initial position; FIG. 4b shows the VSM structure 500 being deformed by the embedded actively deformable element 510 to axially contract from its initial position; and FIG. 4c shows the VSM structure 500 being deformed by the embedded actively deformable element 510 to axially extend from its initial position. Ideally, these actuation elements have stroke capabilities that match the desired deformation in the VSM structure.

Using certain architectures both bending and extension deformation may be achieved in a single element. The specific type of actively deformable element determines the placement and size of that element within the VSM structure. Using extension/contraction elements such as shape memory alloys and/or piezoelectric elements, axial deformation in the VSM structure by symmetric distribution of the material about the cross section of the VSM structure can be achieved. Non-symmetric placement of actuation can result in bending deformation. By combining several non-symmetric elements within a single VSM structure, complex bending in more than one axis of curvature can be achieved.

In certain exemplary embodiments, actuation elements should be connected to the static stiffness elements using the variable stiffness elements to provide zero-power hold and stress transfer when the actuator elements are not in use. Actuators may be placed at different orientations and topologies relative to the static stiffness elements and the variable stiffness elements. Actuator elements may be also placed in various orientations and topologies (series, parallel, connect adjacent or non-adjacent individual stiffness varying portions) to maximize their utility. Actuation elements and VSM structure combinations which permit actuator to stiff element connections at different heights and/or angles from the neutral axis either interior or external to the structure may be desired.

In some embodiments, the low stiffness portions of the variable stiffness elements will either become effective "hinges" or they will stop transmitting force to adjacent high-modulus areas and will form "short circuits" in the load path. Determination of the deformation depends considerably on the connectivity of the variable stiffness elements, stiff elements, and actuator elements.

Figure 5:
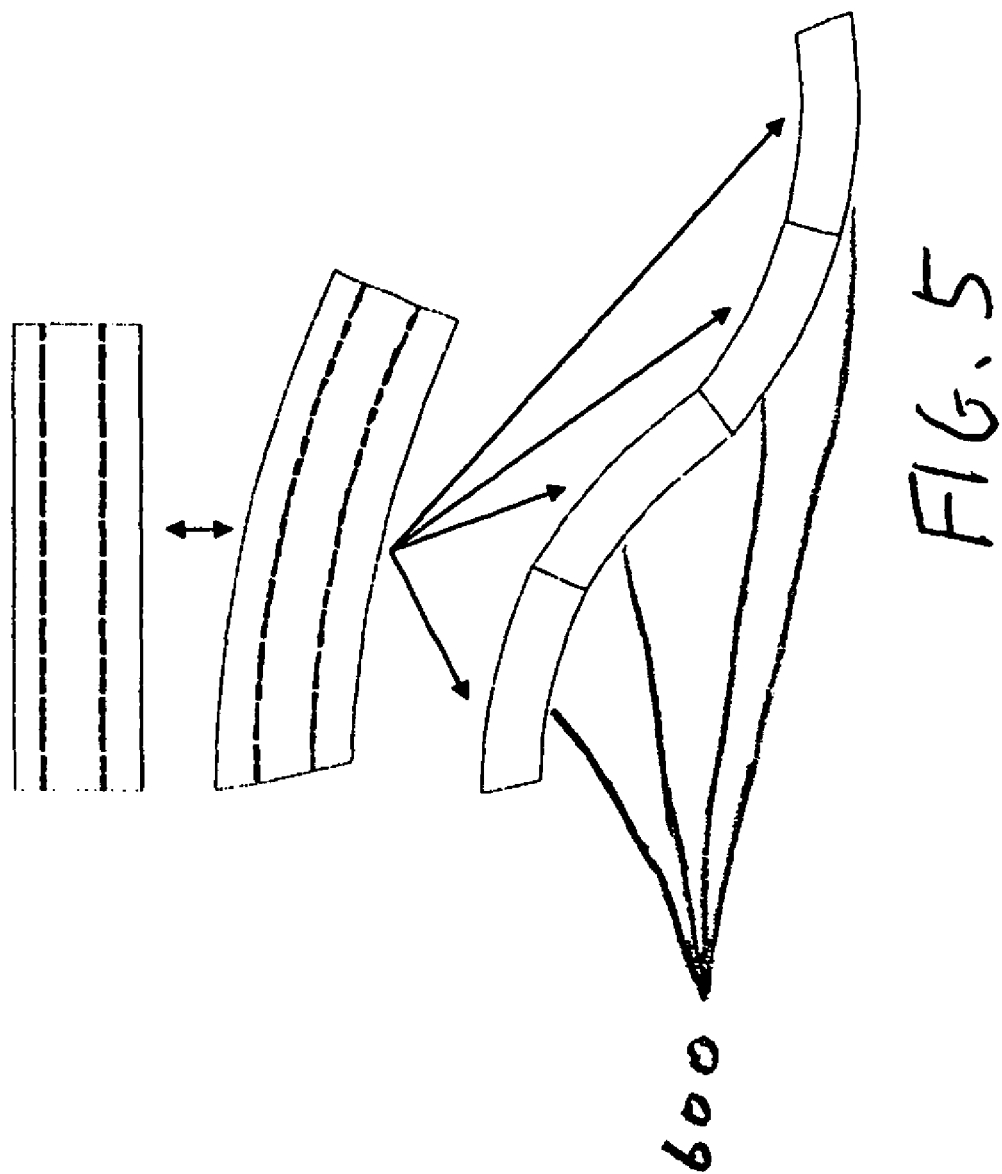
FIG. 5 illustrates the high degree of freedom actuation based on repeating embedded actuation units (or cells)

Using the basic axial and/or bending type element as a building block in a cellular architecture, the architecture can enable even more complex shapes to be created. FIG. 5 shows a complex shape created by using only two mode (bend up or down) portions (or cells or segments) 600 connected in series. Moreover, using portions with an axial change in length (extension/contraction), truss-type structures can be created which change their shape with excitation of individual portion.

Figure 6:
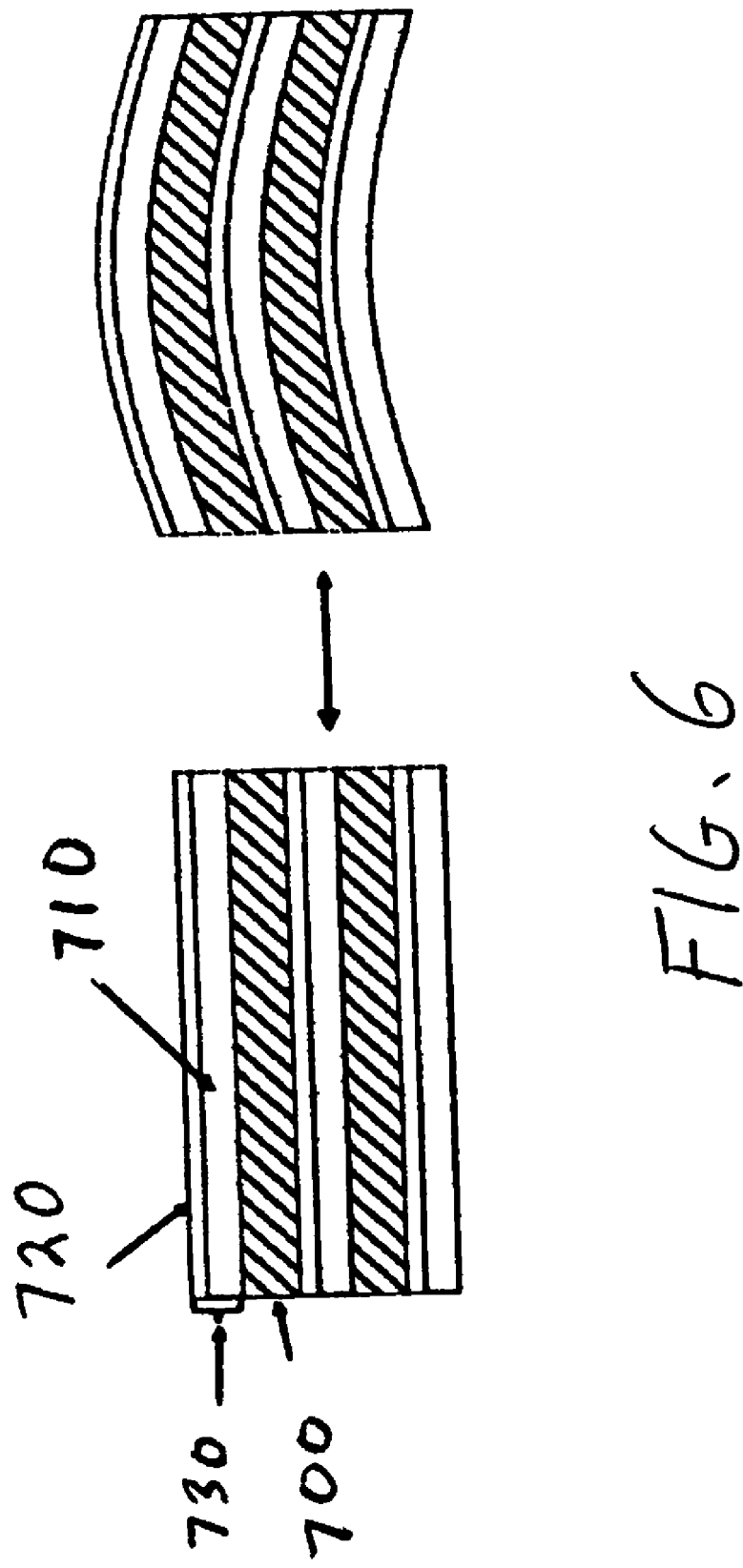
FIG. 6 illustrates actuation of VSM structures based on embedded bending actuation.

Referring to FIG. 6, the design of VSM structures using alternating layers of variable modulus (or stiffness) material layers 700 and constant stiffness material layers 710 allows actuation concepts that take advantage of the layered behavior of the structure. By incorporating an extension type actively deformable element 720 with a constant stiffness material layer 710, a bi-morph actuation element 730 is created (shown in FIG. 6). That is, by actuating these elements with the VSM structure softened, the entire structure can be made to exhibit bending deformation.

A related embodiment uses prefabricated bending actuators, such as piezoelectric or electroactive polymer based bimorphs or unimorphs, embedded within the structure to provide actuation. In the case of surface mounted bimorph actuators, the actuators may be classified as external actuation or internal actuation.

The second exemplary embodiment of the present invention provides a different approach to actuate VSM structures by using external actuation. In the second exemplary embodiment, a separate actuation element, non-limiting examples of which include electric motors, hydraulic actuators, and/or piezoelectric ultrasonic motors, can be used to apply a displacement to the VSM structure, which then deforms into a new operational shape.

In general, as shown in FIGS. 7a, 7b, 7c, and 7d, the second exemplary embodiment includes a VSM structure (e.g., 800), an actuator (e.g., 810), and one or more brackets (e.g., 820) to transfer the load of the actuator (e.g., 810) to the VSM structure (e.g., 800). As can be derived from FIGS. 7a, 7b, 7c, and 7d, various modifications can be envisioned for this type of an approach, such as, a single actuator 800 connected between a VSM structure 800 and a static component 830 via a bracket 820 shown in FIG. 7a; multiple actuators connected between a VSM structures and a static component shown in FIG. 7d, one or more actuators connected on both sides to the VSM structure shown in FIG. 7b; and/or multiple actuators connected in series along a VSM structure to increase the available degrees of freedom in the system shown in FIG. 7c. Similar embodiments may be applied to planar systems to provide a change in surface shapes. In all cases, the actuation path proceeds according to the basic approach where the actuation is performed in a softened stiffness state, and the VSM structure may be stiffened after deformation. The softened stiffness states can, but does not have be the fully softened state. In certain embodiments, a partial softening state can be used. That is, when the structural stiffness is lowered for deforming the structure, the power requirements for actuators are reduced. This allows a wider range of actuation technologies to be considered than in the case of a static stiffness structure. In addition, the power components for actuation can be reduced resulting in a lighter and less bulky structure. Also, for cases where zero power hold is integrated into the VSM structure, the actuator will not be required to support any load once the structure has been stiffened.

The choice of actuators for the external actuation of the second exemplary embodiment may be chosen from a wide array of technologies depending on the particular application. Electromagnetic motors as well hydraulic and pneumatic actuators would be suitable actuators. Other actuation technologies based on smart materials such as piezoelectric stacks, inchworm drives, ultrasonic motors, and/or others can also be used.

Figure 8C:
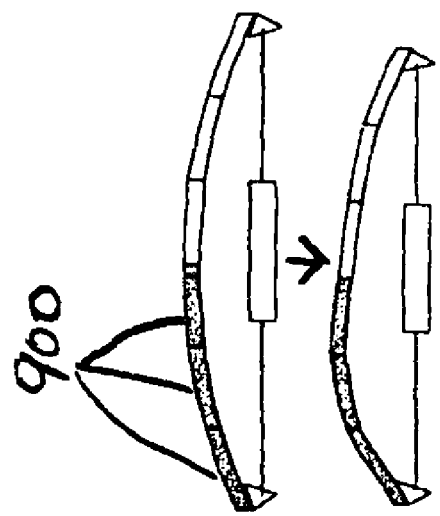
FIGS. 8a, 8b, and 8c illustrate local stiffness control in a beam element to enable multiple degrees of freedom from a single actuator input.
Figure 8B:
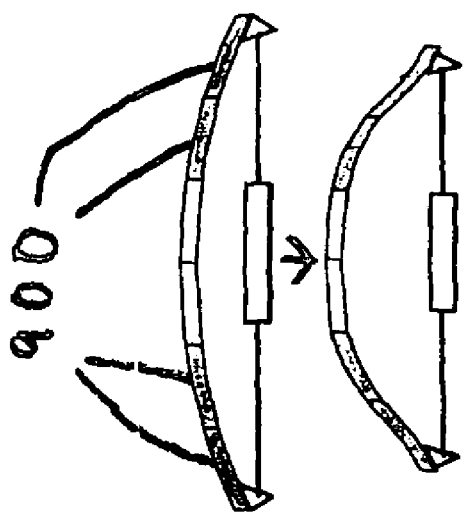
Figure 8A:
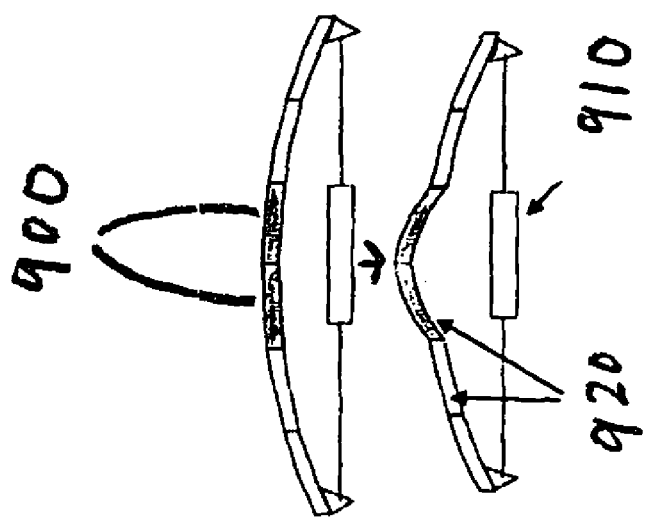

FIGS. 8a, 8b, and 8c illustrate a concept of local stiffness control in a beam element to enable multiple degrees of freedom from a single input of an actuator (e.g., 910). In FIGS. 8a, 8b, and 8c, the shaded segments (or regions) 900 of the variable modulus (or stiffness) segments (or portions) 920 are of reduced modulus, and the upper and lower parts of FIGS. 8a, 8b, and 8c show the beam before and after deformation, respectively. As such, an important implication of VSM structures is tailoring of local stiffness values within a structural component before/during application of actuation load to provide additional shape authority over constant stiffness approaches. If the stiffness of a material can be controlled locally, the compliance of the structure as a whole can be tailored such that the response to an actuation load provides varying deformation contours. This concept is demonstrated in the FIGS. 8a, 8b, and 8c where the structure is composed of 6 equal segments (or portions) 920 whose stiffness can be individually controlled. In each depiction of FIGS. 8a, 8b, and 8c, the darkened (or shaded) segments 900 of the segments 920 are reduced in stiffness while all other segments 920 are maintained at high stiffness.

In FIGS. 8a, 8b, and 8c, as an equal displacement is placed upon the structures, the shape of each structure varies depending on the location of the reduced stiffness areas. In this fashion, the shape of the deforming structure may be altered for identical actuator displacement. As such, a single actuator can enable a much broader range of output shapes than are possible without local stiffness control. Moreover, local stiffness control also allows for the ability to cause deformation even without the application of an actuation force. In this case, if strain energy is stored within the structure in regions of high stiffness, a change in the stiffness configuration can cause deformation of the structure through release of this strain energy into the softer regions. This allows deformation and shape control to be achieved in certain cases without actuators or with reduced numbers of actuators.

The above description describes a process where a single adjustment to the local structure stiffness distribution is performed followed by an actuation step. Further utility is possible by combining more actuation steps in succession, thereby obtaining further shape control.

FIGS. 9a, 9b, and 9c respectively show cross-sectional, bottom, and top views of a planar surface using VSM structures where subregions (or individual portions) can be tuned to specific stiffness values. As shown in FIGS. 9a, 9b, and 9c, an array of individually addressable external actuators 1010 supported by actuator support 1020 on variable stiffness portions (or elements) 1000 can be used to apply forces and displacement to the surface of the variable stiffness portions 1000.

The combination of stiffness control and distributed actuation allows a wider variety of surface contours to be achieved than is possible with uniform stiffness changes. In addition, as an equal displacement is placed upon the structures, the shape of each structure can vary depending on the location of the reduced stiffness areas. In this fashion, the shape of the deforming structure may be differently altered with identical actuator displacement. As with the beam type description of local stiffness control, both actuation and changes in stiffness may be used to change shape. In certain cases where strain energy has been stored in the system, a change in stiffness alone can be used to deform the structure without the application of actuation.

In addition, local control of stiffness can be applied to all the actuation embodiments described above. Further utilities may also be gained by using a locally controllable stiffness. For example, the structural stiffness and strength of the component may be better maintained during a deformation and/or transformation if the transformation is performed sequentially in small strategically chosen areas that are then swept across the surface. In addition, the power required to transform the VSM structure may be reduced when the overall transformation is completed using numerous changes in smaller portions of the structure. This is especially useful if the power available to reconfigure the surface is limited by available system resources. Another advantage of the present system is the ability to maintain desired shape and performance as the component ages. By making small changes in localized areas, the system can correct for and mitigate changes accrued over the lifetime of the component.

Figure 10:
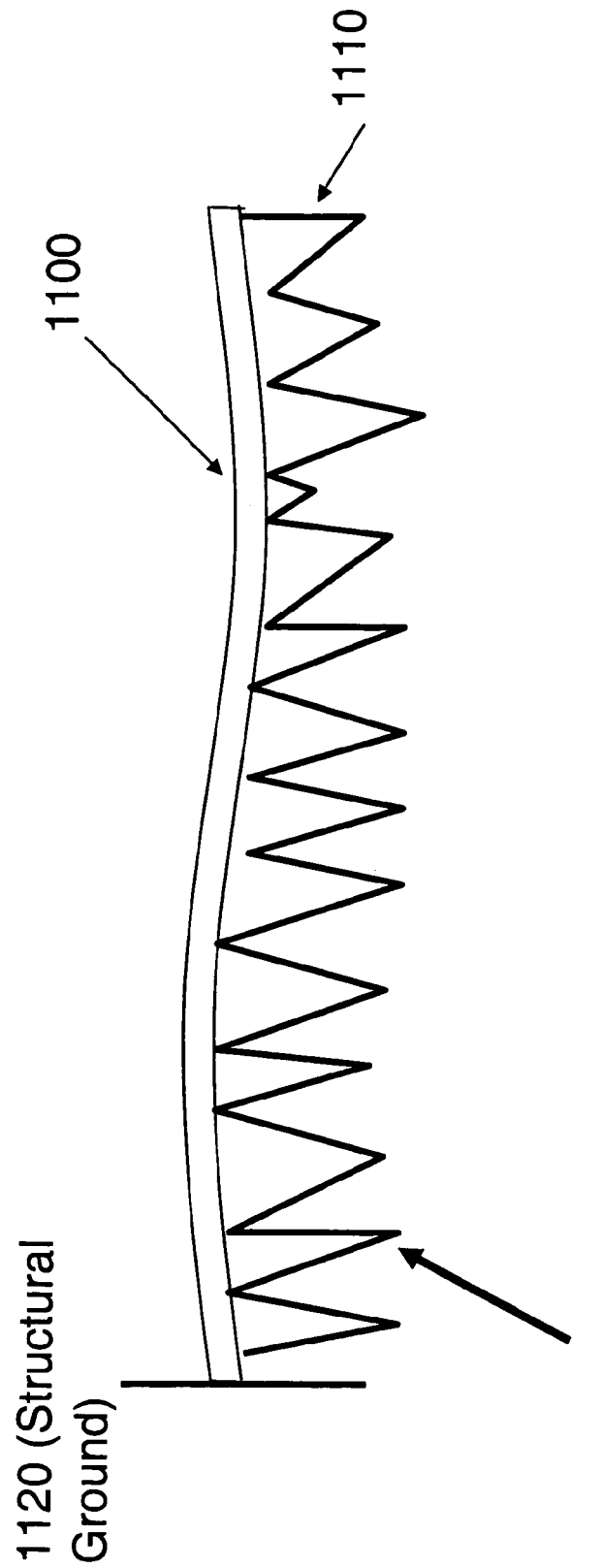
FIG. 10 is a schematic of an integration of a variable stiffness surface with a compliant mechanism designed to provide additional control over surface deformations.

One important approach to achieving shape control using variable stiffness materials is the combined use of variable stiffness materials and compliant mechanisms. Compliant mechanisms, as described in U.S. Patent Application Publication No. 2003-0102411, allow the transduction of force and displacements to desired quantities. These structures can be integrated into variable stiffness structures using different techniques. In one embodiment, a compliant structure is attached at several points along a variable stiffness surface such that load and displacement are transferred at these locations. By softening the variable stiffness material, the energy required to deform the structure is dramatically reduced as compared to static stiffness compliant mechanisms. In addition, a greater level of deformation may be achieved for a material with a given stiffness. In addition, while in typical compliant mechanism enabled surfaces, the external loads are transmitted to actuators, the variable stiffness material embodiment allows the structure itself to take up external loads once it has been stiffened to a zero power hold position. A further extension of this approach uses individually addressable stiffness portions within the surface to alter the effect of the compliant mechanism. In this approach, additional degrees of freedom may be obtained as compared to static stiffness compliant mechanism system providing an enhancement over static stiffness variable stiffness materials. A basic schematic of this embodiment is given in FIG. 10. Here a variable stiffness surface 1100 has been affixed to a compliant mechanism 1110, and the entire structure is fixed to a immovable structural ground point 1120. After softening the variable stiffness surface 1100, application of force as optimized in the compliant mechanism 1110 provides a previously determined deformation to be achieved. The surface 1100 may be subdivided into individually addressable stiffness portions so that the effect of the compliant mechanism 1110 can be further controlled.

Figure 11:
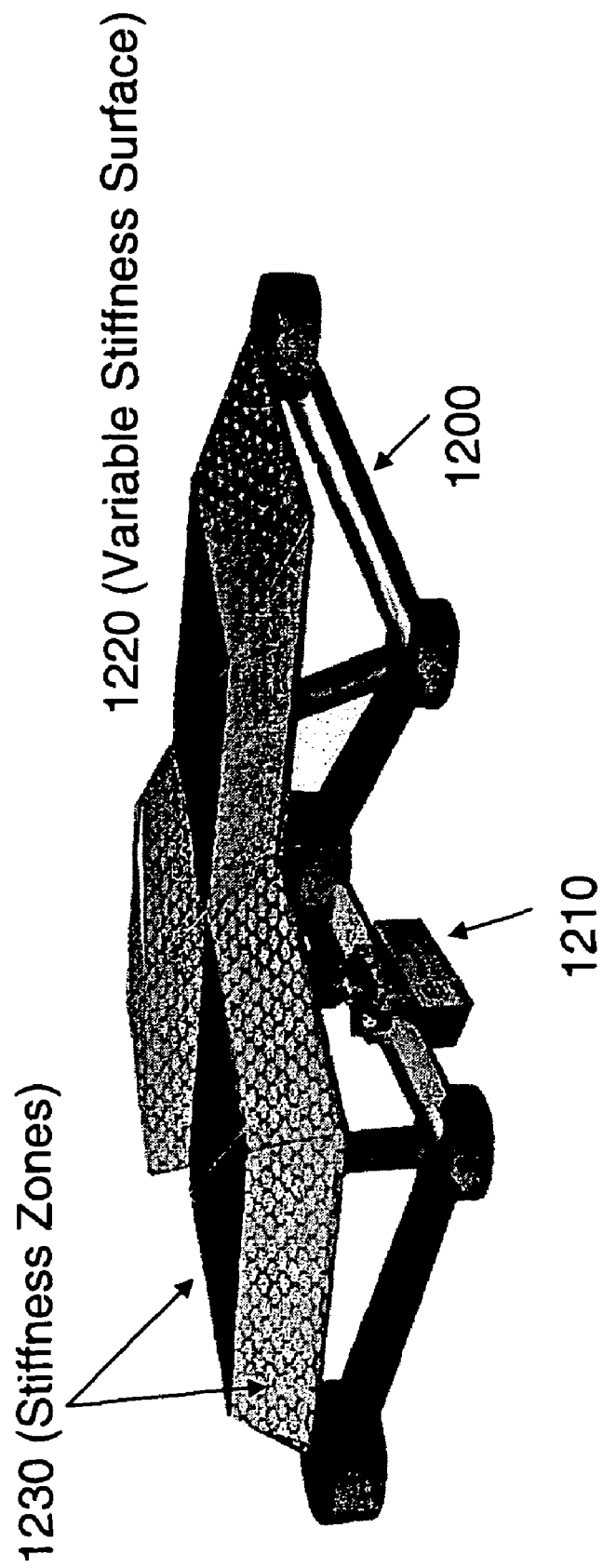
FIG. 11 is a schematic of a variable stiffness surface with an active truss support to provide deformations.

Another embodiment uses a specially designed truss or cellular support structure to apply actuation loads to the surface. In this approach, a backing structure composed of a truss with members which may be altered in length using motors and actuators can be used to deform the surface. By combining actuators in various positions of the supporting truss along with a surface divided into individually addressable portions, an extremely high degree of shape control can be achieved. This embodiment is schematically represented in FIG. 11 where a truss 1200 with adjustable length members (having actuator/truss leg 1210) and a variable stiffness surface 1220 with individually addressable portions (or stiffness zones) 1230 are shown. By using both single and sequential actuation steps, a surface may be made to control a wider variety of desired shapes than is possible with static stiffness systems. Therefore, this embodiment represents a significant improvement in the controllability of the surface shape over the static stiffness systems. Several potential truss networks can be used for this application, among them is the tetrahedral truss and Kagome truss.

While certain exemplary embodiments have been described in detail and shown in the accompanying drawings, it is to be understood that such embodiments are merely illustrative of and not restrictive of the broad invention. It will thus be recognized by a person skilled in the art that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims and equivalents thereof.

What is claimed is:

1. A deformable apparatus having a transformable state of stiffness, the deformable apparatus comprising:
    a variable stiffness material (VSM) structure having a first shape and comprising:
        a plurality of constant stiffness material layers; and
        a plurality of variable modulus material layers arranged in alternating layers with the plurality of constant stiffness material layers, the plurality of variable modulus material layers comprising a material having a changeable elastic modulus in response to a trigger to allow reversible coupling and decoupling of stress transfer between successive layers of the plurality of constant stiffness material layers to provide a change in the transformable state of stiffness of the VSM structure; and
    one or more actuation elements controlled to deform the VSM structure from the first shape to a second shape by providing actuation, upon transformation of the structure from a first state of stiffness to a second state of stiffness while maintaining the first shape, the second state having a lower degree of stiffness than the first state,
    wherein the one or more actuation elements are controlled to provide deformation within the VSM structure to result in a change in shape of the deformable apparatus while the VSM structure is in the second state of stiffness, and
    wherein the VSM structure is adapted to transform back from the second state of stiffness to the first state of stiffness while maintaining the second shape.

2. The deformable apparatus of claim 1, wherein the one or more actuation elements are controlled to provide the actuation upon receiving an external control signal comprising an electrical field, a thermal field, and/or a magnetic field.

3. The deformable apparatus of claim 1, wherein the one or more actuation elements are embedded within the VSM structure.

4. The deformable apparatus of claim 3, wherein two of the embedded one or more actuation elements are configured to bend the VSM structure along an axis of curvature.

5. The deformable apparatus of claim 3, wherein one of the embedded one or more actuation elements is configured to extend the VSM structure along an axis of the VSM structure.

6. The deformable apparatus of claim 4, wherein the actuation provided by the embedded one or more actuation elements contract the VSM structure along an axis of the VSM structure.

7. The deformable apparatus of claim 3, wherein the actuation provided by the one or more embedded actuation elements extends the VSM structure along an axis of the VSM structure.

8. The deformable apparatus of claim 3, wherein the actuation provided by the one or more embedded actuation elements contracts the VSM structure along an axis of the VSM structure.

9. The deformable apparatus of claim 3, wherein at least one of the one or more actuation elements includes a bimorph actuator comprising one of the plurality of constant stiffness material layers.

10. The deformable apparatus of claim 1, wherein the one or more actuation elements are disposed adjacent to the VSM structure.

11. The deformable apparatus of claim 10, wherein the one or more actuation elements comprise an electric motor.

12. The deformable apparatus of claim 10, wherein the one or more actuation elements comprise a hydraulic or pneumatic actuator.

13. The deformable apparatus of claim 10, wherein the one or more actuation elements comprise a piezoelectric ultrasonic motor or a piezoelectric inchworm type motor.

14. The deformable apparatus of claim 10, further comprising one or more brackets for transferring to the VSM structure a load corresponding to at least one of the one or more actuation elements.

15. The deformable apparatus of claim 1, wherein the VSM structure comprises a plurality of individual portions and wherein respective states of stiffness corresponding to the individual portions of the VSM structure are individually controllable.

16. The deformable apparatus of claim 15, wherein each of the one or more actuation elements corresponds to one of the plurality of individual portions.

17. A deformable apparatus having a transformable state of stiffness, the deformable apparatus comprising:
   a variable stiffness material (VSM) structure having a plurality of individually controlled stiffness varying portions, each having a first shape,
   wherein respective states of stiffness corresponding to the individually controlled stiffness varying portions of the VSM structure are individually controllable to deform the VSM structure,
   wherein at least one of the individually controlled stiffness varying portions is controlled to transform from a first state of stiffness to a second state of stiffness while maintaining its first shape, the second state having a lower degree of stiffness than the first state, and
   wherein the individually controlled stiffness varying portions are controlled such that a predetermined stiffness arrangement is achieved which when combined with an actuator input deforms the at least one of the individually controlled stiffness varying portions from its first shape to a second shape while it is in its second state of stiffness to yield a desired shape of the deformable apparatus.

18. The deformable apparatus of claim 17, wherein the VSM structure comprises one or more individual portions that respond to actuation elements, and wherein the individually controlled stiffness varying portions and the one or more individual portions that respond to actuation elements can be sized differently with respect to each other or in a one-to-one correspondence.

19. The deformable apparatus of claim 17, further comprising one or more actuation elements controlled to further deform the VSM structure.

20. The deformable apparatus of claim 19, wherein each of the individually controlled stiffness varying portions responds individually to an actuation provided by the one or more actuation elements.

21. The deformable apparatus of claim 20, wherein a shape control is achieved (1) by applying an actuation displacement to the VSM structure such that a strain energy is stored within a first group of the individually controlled stiffness varying portions and (2) by softening a second group of the individually controlled stiffness varying portions such that a desired change in shape is achieved by a release of the strain energy.

22. The deformable apparatus of claim 17, wherein a force and displacement distribution mechanism is used to apply distributed loads and displacements to a surface of the VSM structure.

23. The deformable apparatus of claim 17, wherein a variable plane truss or space truss is attached to a surface of the VSM structure to provide actuation loads and support to the surface.

24. The deformable apparatus of claim 23, wherein a transformation of at least one of the individually controlled stiffness varying portions to a lower state of stiffness is combined with actuation loads applied by the plane truss or space truss to achieve a surface shape change.

* * * * *